US012570866B2

(12) United States Patent
Loccufier et al.

(10) Patent No.: US 12,570,866 B2
(45) **Date of Patent: *Mar. 10, 2026**

(54) INK SET FOR INKJET PRINTING

(71) Applicant: AGFA NV, Mortsel (BE)

(72) Inventors: Johan Loccufier, Mortsel (BE); Jos Louwet, Mortsel (BE); Luc Decoster, Mortsel (BE)

(73) Assignee: AGFA NV, Mortsel (BE)

( * ) Notice: Subject to any disclaimer, the term of this patent is extended or adjusted under 35 U.S.C. 154(b) by 756 days.

This patent is subject to a terminal disclaimer.

(21) Appl. No.: 17/922,628

(22) PCT Filed: Apr. 26, 2021

(86) PCT No.: PCT/EP2021/060817

§ 371 (c)(1),
(2) Date: Nov. 1, 2022

(87) PCT Pub. No.: WO2021/224047

PCT Pub. Date: Nov. 11, 2021

(65) Prior Publication Data

US 2023/0167324 A1 Jun. 1, 2023

(30) Foreign Application Priority Data

May 5, 2020 (EP) .................................... 20172948

(51) Int. Cl.

*C09D 11/40* (2014.01)
*B41J 11/00* (2006.01)
*C09D 11/033* (2014.01)
*C09D 11/102* (2014.01)
*C09D 11/106* (2014.01)

(52) U.S. Cl.

CPC ............. *C09D 11/40* (2013.01); *B41J 11/002* (2013.01); *C09D 11/033* (2013.01); *C09D 11/102* (2013.01); *C09D 11/106* (2013.01)

(58) Field of Classification Search

CPC ..... C09D 11/40; C09D 11/033; C09D 11/102; C09D 11/106; C09D 11/54; B41J 11/002

See application file for complete search history.

(56) References Cited

U.S. PATENT DOCUMENTS

| | | | | |
|---|---|---|---|---|
| 2002/0077385 | A1 | 6/2002 | Miyabayashi | |
| 2011/0050795 | A1* | 3/2011 | Arai | C09B 67/0022 524/211 |
| 2018/0216289 | A1* | 8/2018 | Petton | D06P 5/30 |
| 2019/0249024 | A1* | 8/2019 | Shinohara | B41M 5/0023 |
| 2020/0109301 | A1 | 4/2020 | Mizutaki et al. | |

FOREIGN PATENT DOCUMENTS

| | | | |
|---|---|---|---|
| CN | 107532026 | A | 1/2018 |
| EP | 1041126 | A2 | 10/2000 |
| EP | 1125760 | A1 | 8/2001 |
| EP | 2368946 | A1 | 9/2011 |
| JP | 2019-137760 | A | 8/2019 |
| JP | 2020-509148 | A | 3/2020 |
| WO | WO 2001/008895 | A | 2/2001 |
| WO | WO 2018/138054 | A1 | 8/2018 |

OTHER PUBLICATIONS

U.S. Appl. No. 17/922,625, filed Nov. 1, 2022.
U.S. Appl. No. 17/922,818, filed Nov. 2, 2022.
U.S. Appl. No. 17/922,820, filed Nov. 2, 2022.
U.S. Appl. No. 17/923,024, filed Nov. 3, 2022.
European Patent Office, International Search Report in International Patent Application No. PCT/EP2021/060817, mailed Jul. 16, 2021, 3 pp.
European Patent Office, Written Opinion in International Patent Application No. PCT/EP2021/060817, mailed Jul. 16, 2021, 4 pp.

* cited by examiner

*Primary Examiner* — Doris L Lee
(74) *Attorney, Agent, or Firm* — Leydig, Voit & Mayer, Ltd.

(57) ABSTRACT

An ink set for inkjet printing comprising an aqueous liquid containing an organic resin particle comprising a first resin having at least one repeating unit functionalized with a primary amine and an aqueous inkjet ink containing a colorant and a second resin capable of reacting with the primary amine functional group of the first resin.

10 Claims, No Drawings

INK SET FOR INKJET PRINTING

CROSS-REFERENCE TO RELATED APPLICATIONS

This patent application is the U.S. national phase of International Patent Application No. PCT/EP2021/060817, filed Apr. 26, 2021, which claims the benefit of European Patent Application No. 20172948.0, filed May 5, 2020.

Technical Field

The present invention relates to an ink set comprising an aqueous liquid comprising resin particles and an aqueous inkjet ink, useful in inkjet image recording.

Background Art

Ink jet technology is evolving from an imaging technology into an industrial production methodology for digital manufacturing in different fields of technology such as decorative applications in flooring and furniture, electronics, textile printing, leather printing and glass printing, with an increasing interest in water based ink technology to replace UV technologies. Often the printed functionalities have to withstand harsh conditions hence requiring high chemical and mechanical resistance. In order to increase this resistance, inkjet inks comprising latexes giving film formation upon drying and heating have been commercialized. The disadvantage of these inks is that the film formation also occurs at the nozzle of the inkjet head leading to unreliable jetting performances. Other concepts in order to withstand harsh conditions include the crosslinking of resins contained in the aqueous inkjet inks to form images having a cross-linked binder network.

One of the most popular crosslinking agents are polyfunctional primary or secondary amines because they react easily with resins such as epoxy based resins. Preferably, the polyfunctional amine is kept apart from the resin with which it should react upon image formation to avoid interaction imparting the shelf-life of the resin containing aqueous inkjet ink. This can be achieved by including the polyfunctional amine in a reactant liquid such as a primer, to be under-coated or under-printed with respect to the resin containing inkjet ink or in an over print varnish, to be over-printed or over-coated with respect to the resin containing inkjet ink. The polyfunctional primary or secondary amine should be water soluble or water-dispersible to include it in the aqueous primer or over-print varnish.

It has advantages if the reactant liquids such as primers or over-print varnishes can be applied image wise (=printing) the same way as the aqueous inkjet ink on a recording medium over non-image wise application onto the recording medium. The advantages are: a reduced amount of liquid coverage leading to a cost reduction and a faster drying of the printed images. Another advantage of the under-printing of a primer is that the primer does not need to be as resistance to mechanical impact (scratch, abrasion, . . . ) or chemicals (water, solvents) as the ink which is jetted on top of the primer giving more formulation latitude. The most popular image wise application method for a primer or over-print varnish is using an inkjet equipment, just as for the image recording.

US2019/0249024A discloses an ink set comprising two different inks, a first ink containing an epoxy compound and a second ink containing an amine based polymer.

However, water soluble primary amine functionalized polymers have a considerable impact on the ink rheology and the viscoelastic properties of the liquids making them less suitable for high speed ink jet printing.

US2002/0077385 discloses an ink set comprising a first ink containing a polymer having an anionic group and a second ink having a polymer containing a cationic group to form aggregates when both inks come into contact with each other.

There is still a need for jettable printing liquids providing improved physical properties of printed images such as solvent resistance and further showing a reliable jetting behaviour with inkjet heads.

SUMMARY OF INVENTION

It is the objective of the present invention to provide a solution to the above stated problem. The objective has been achieved by providing an ink set comprising an aqueous liquid containing primary amine functionalized particles and an aqueous inkjet ink comprising a resin as defined in claim 1.

It is another embodiment of the invention to provide an image recording method using an aqueous liquid comprising primary amine functionalized cationic polymeric nanoparticles and an aqueous inkjet ink of claim 1 .

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

A. Ink Set for Inkjet Printing

A.1. Aqueous Liquid Containing Organic Resin Particle.

A.1.1. Organic Resin Particle Functionalized with a Primary Amine.

The aqueous liquid making part of the ink set according to the invention comprises water and an organic resin particle, characterized in that the resin, from now on called first resin, comprises at least one repeating unit functionalized with a primary amine. The presence of a resin functionalized with a primary amine in the aqueous liquid as a particle, assures a reliable jetting behaviour with respect to an aqueous liquid having this resin not present as a particle. Without being bound by a theory, it is thought that resin particles do not negatively impact the viscoelastic properties of the aqueous liquid and hence does not negatively impact the jetting reliability by means of inkjet heads.

In a further preferred embodiment, the first resin according to the present invention comprises at least 5 mol % of repeating units, functionalized with a primary amine, more preferably at least 10 mol % and most preferably at least 15 mol %. The higher, the amount of repeating units, the higher the reactivity and resistance against mechanical and chemical impact of the formed resin and hence of the image.

The amine content, expressed as mg $NH_2$ per g resin is preferably at least 50 mg/g, more preferably at least 70 mg/g and most preferably at least 90 mg/g.

In a further preferred embodiment, the first resin, functionalized with primary amines is prepared by emulsion polymerization, surfactant free emulsion polymerization, seeded emulsion polymerization and micro- and mini-emulsion polymerization, preferably of a monomer selected from the group consisting of 4-aminomethyl-styrene or salt thereof, 2-aminoethyl-acrylate or salt thereof, 2-aminoethylmethacrylate or salt thereof, 3-aminopropyl-acrylamide or salt thereof, 3-aminopropyl-methacrylamide, 4-aminomethyl-styrene and 2-aminothyl-methacrylate or salt thereof being more preferred.

In another preferred embodiment, the first resin, functionalized with primary amines is prepared by grafting hydrophobic polymeric chains on primary amine functionalized polymers such as poly(allylamine) and poly(vinyl amine).

In a preferred embodiment, said repeating unit functionalized with a primary amine is selected from the group consisting of a vinyl amine and an allyl amine.

In a particularly preferred embodiment, the first resin is a cationic organic resin particle, functionalized with primary amines, characterized in that said cationic organic resin particle comprises a first resin, comprising at least:

a. a repeating unit selected from the group consisting of an allyl amine and a vinyl amine; and
b. an oxalyl amide crosslinking unit —NHCOCONH—, wherein the dashed lines represent the covalent bond to the polymer residue of said first resin; and
c. a repeating unit according to general formula I and/or general formula II general formula I

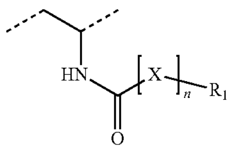

wherein

X represents O or NH n represents 0 or 1

$R_1$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group with the proviso that $R_1$ contains at least six carbon atoms.

general formula II

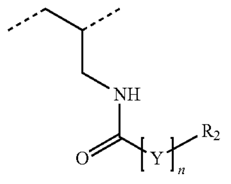

wherein

Y represents O or NH n represents 0 or 1

$R_2$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group with the proviso that $R_2$ contains at least six carbon atoms.

The aqueous liquid according to the present invention contains the organic resin particles in an amount of 1 wt. % to 30 wt. %, more preferably in an amount of 5 wt. % to 25 wt. % and most preferably in an amount of 10 wt. % to 20 wt. %.

The average particle diameter of organic resin particles may be from about 10 nm to about 1 μm. Preferably, the average particle diameter may be from about 10 nm to about 500 nm. When the average particle diameter is within this range, clogging of nozzles of inkjet head is avoided. More preferably, the average particle diameter may be from about 50 nm to about 250 nm. Still more preferably, the average particle diameter may be from about 160 nm to about 220 nm.

The aqueous liquid can be applied onto the substrate or onto the printed images by means of a coating technique, a spraying technique or a jetting technique. Preferable jetting techniques are inkjet and valve jet.

A.1.2. Water Soluble Organic Solvent

The aqueous liquid making part of the ink set according to the invention may contain, besides water as a solvent, also a water-soluble organic solvent. Examples of water-soluble organic solvents include polyhydric alcohols such as diethylene glycol, triethylene glycol, dipropylene glycol, 1,3-propanediol, 1,3-butanediol, 1,4-butanediol, 2,2-dimethyl-1, 3-propanediol, 2-methyl-1, 3-propanediol, 1,2-pentanediol, 2,4-pentanediol, 1,5-pentanediol, 1,6-hexanediol, 2-ethyl-1, 3-hexanediol, 1,2-hexanediol and 2,5-hexanediol, polyhydric alcohol alkyl ethers such as dipropylene glycol n-propyl ether, tripropylene glycol methyl ether, tripropylene glycol n-propyl ether, propylene glycol phenyl ether, triethylene glycol methyl ether, triethylene glycol methyl ether, triethylene glycol ethyl ether, diethylene glycol n-hexyl ether and ethylene glycol phenyl ether, and nitrogen-containing heterocyclic compounds such as 2-pyrrolidone and N-methylpyrrolidone.

Other preferred water soluble organic solvents include ethylene glycol, propylene glycol, 1,2-butanediol, 2,3-butanediol, 2-methyl-2, 4-pentanediol, dipropylene glycol monomethyl ether, propylene glycol n-butyl ether, propylene glycol t-butyl ether, diethylene glycol methyl ether, ethylene glycol n-propyl ether and ethylene glycol n-butyl ether.

The water-soluble organic solvent is added to the liquid to prevent fast drying of the aqueous liquid at the nozzle of the inkjet head, to help dissolving organic compounds and to help penetration into porous substrates such as paper.

The content of the water-soluble organic solvent, in the aqueous liquid is preferably less than 70 wt. %. If the content exceeds 70% by mass, the liquid loses its water based, hence more green character. The amount of water-soluble organic solvent is preferably between 1 and 40 wt. %, more preferably between 5 and 40 wt. %.

A.1.3. Surfactant

In the aqueous liquid of the present invention, a surfactant may be added in order to ensure wettability onto the substrate, if used as a primer or onto the printed images if used as an over-print varnish. The amount of the surfactant added is preferably 0.1 wt. % to 5 wt. % as an active component in the liquid.

If the amount added is below 0.1% by mass, wettability onto the substrate or printed images is not sufficient and causes degradation in image quality and in adhesion to the substrate. The surfactant that can be used is not particularly limited as long as it satisfies the above limitation.

The surfactant is preferably an amphoteric surfactant, a non-ionic or cationic surfactant because interaction with the cationic resin particles are reduced with respect to an anionic surfactant. Examples of non-ionic surfactants are polyoxyethylene alkyl phenyl ether, polyoxyethylene alkyl ester, polyoxyethylene alkylamine, polyoxyethylene alkyl amide, a polyoxyethylene propylene block polymer, sorbitan fatty acid ester, polyoxyethylene sorbitan fatty acid ester and an ethylene oxide adduct of acetylene alcohol are preferably used in terms of a relationship between dispersing stability and image quality. In addition, a fluorine-based surfactant and a silicon-based surfactant can be used in combination (or singly) depending on formulation.

Suitable non-ionic surfactants are preferably a glycol surfactant and/or an acetylene alcohol surfactant. The use of the acetylene glycol surfactant and/or the acetylene alcohol surfactant further reduces bleeding to improve printing quality, and also improves the drying property in printing to allow high-speed printing.

The acetylene glycol surfactant and/or the acetylene alcohol surfactant is preferably one or more selected from 2, 4, 7, 9-tetramethyl-5-decine-4, 7-diol, alkylene oxide adducts of 2,4,7,9-tetramethyl-5-decine-4, 7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine E1010, or from Nissin Chemical Industry as Surfynol (registered trademark) 465 and Surfynol 61.

Other suitable surfactants are siloxane based surfactants such as Tego Twin 4000 from Evonik Industries, Tegowet 270 from Evonik industries, Hydropalat WE3220 from BASF, silane based surfactants such as Silwet HS312 from Momentive and fluor containing surfactants such as: Thetawet FS8150 from Neochem GMBH, Capstone FS3100 from Dupont, Tivida FL2500 from Merck and surfactants from the Dynol, Envirogem & Surfynol series from Air products.

Examples of cationic surfactants include tetraalkylammonium salts, alkylamine salts, benzalkonium salts, alkylpyridium salts and imidazolium salts, such as dihydoxyethylstearylamine, 2-heptadecenylhydroxyethylimidazoline, lauryldimethylbenzylammonium chloride, cetylpyridinium chloride and stearamidemethylpyridium chloride.

A.1.4. Additives

Together with the organic resin particles, a multivalent metal ion or cationic polymer can be contained in the liquid, especially when the liquid is a primer liquid or fixer liquid and is coated or printed onto a substrate prior to the jetting of the colored aqueous inkjet ink. The multivalent metal ion or cationic polymer is able to cause aggregation of the colorants in the aqueous inkjet ink when jetted onto the primer. These polyvalent metal ions or cationic polymers have a function of aggregating ink by acting on anionic groups such as the carboxyl groups on the surface of the pigment or the dispersed polymer contained in the ink. As a result, the ink remains immobilized on the surface of the substrate to improve the colour-developing property. Therefore, it is preferred that the surface of the pigment in the ink and/or the dispersed polymer of the capsules contained in the ink have an anionic group selected from the group of carboxyl group, sulfonate group and phosphonate group, most preferably carboxyl group.

Suitable examples of water-soluble metal salts are formed from bi- or higher valent metal cations, such as magnesium, calcium, strontium, barium, zirconium, and aluminum, and anions, such as a fluoride ion ($F^-$), a chloride ion ($Cl^-$), a bromide ion (Br), a sulfate ion ($SO_4^{2-}$), a nitrate ion ($NO_3^-$), and an acetate ion ($CH_3COO^-$).

Suitable examples of cationic polymers include polyamines, quaternized polyamines and polyguanidines. Other cationic polymers include poly(N, N, -dimethyl-2-hydroxypropylene ammonium chloride), poly(4-vinyl-1-methyl-pyridinium bromide), polydiallydimethylammoniumchloride, copolymers of quaternized vinylimidazole and polyquaternium. Examples of polyamines that can be preferably employed in the primer of the invention of this include polyethyleneimine, polyvinylpyridine, polyvinylamine, polyallylamine, and combinations thereof.

The primer liquid may also contain colorants, such as pigments. Particularly useful for printing on colored substrates such as dark textile, brown corrugated cardboard or colored leather is a primer liquid containing a white pigment. The preferred pigment for the aqueous treatment liquid ink is titanium dioxide. Titanium dioxide ($TIO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully setforth.

The titanium dioxide particles can have a wide variety of average particle sizes of about 1 micron or less, depending on the desired end use application of the treatment liquid. For applications demanding high hiding or decorative printing applications, the titanium dioxide particles preferably have an average size of less than about I μm. Preferably, the particles have an average size of from about 50 to about 950 nm, more preferably from about 75 to about 750 nm, and still more preferably from about 100 to about 500 nm.

In addition, unique advantages may be realized with multiple particle sizes, such as opaqueness and UV protection. These multiple sizes can be achieved by adding both a pigmentary and a nano grade of $TIO_2$.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photoreactivity of the titanium dioxide. Metal oxide coatings of alumina, aluminasilica, boria and zirconia result in a positive charged surface of the $TiO_2$ pigments and hence are particularly useful in combination with the cationic stabilised resin particles of the invention because no additional surface treatment of the pigment is required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan). Other suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO2008/074548.

If the aqueous liquid is an over-print varnish or post-treatment liquid which is applied onto the printed image, the liquid may include an additional resin or binder. The binder may be present in the liquid of at least 10 weight percent to about 30 weight percent. The binder may be a latex. In one example, the latex may be selected from a group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers, polyurethanes and mixtures thereof. Preferably, the latex has a cationic charge in order to be compatible with the cationic organic resin particles of the invention.

The liquid may also contain humectants. Humectants are preferably incorporated if the liquid has to be applied by means of a jetting technique such as inkjet or valve jet. Humectants prevent the clogging of nozzles. The prevention is due to its ability to slow down the evaporation rate of the aqueous liquid, especially the water in the liquid. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The aqueous liquid as part of the ink set according to the invention may also function as an aqueous inkjet ink in the formation of an image, also called co-reactive inkjet ink due to its ability to react with the aqueous inkjet ink of the ink set. In that case, the liquid comprises a colorant, preferably a pigment. More preferably, pigments having cationic dispersing groups or dispersing agents, are to be used in order to minimize interaction with the resin particles having primary amine functional groups. Examples of suitable dispersing agents are disclosed in WO2018138054 en WO2018137993. Both references are incorporated by reference. Suitable pigments to be incorporated in the jettable liquid of the present invention are described in § A.2.3

The humectant is preferably added to the liquid formulation in an amount of 0.1 to 20 wt. % based on the total weight of the liquid.

A.2. Aqueous Inkjet Ink.

A.2.1. Second Resin Capable of Reacting with a Primary Amine Functional Group

The aqueous inkjet ink making part of the ink set of the invention, comprises water, a colorant and a second resin capable of reacting with a primary amine functional group. Preferably the reaction between the second resin and the primary amine functional group takes place at elevated temperature with respect to room temperature, hence preferably above 60° C., more preferably above 80° C. Preferably, the resin is selected from the group of epoxy based resins, β-keto-ester based resins and polymers functionalized with activated double bonds such as oligofunctional maleimides and acrylates. If the temperature is below 60° C., the reaction does not take place or is incomplete, hence the crosslinking of the second resin is not occurring leading to an insufficiently improved mechanical or chemical resistance of the formed image.

Examples of the epoxy based resins may include polyethylene glycol di glycidyl ether, diglycerol polyglycidyl ether and sorbitol polygycidyl ether. More specific examples may include Dinacol EX-821, Dinacol EX-841, Dinacol EX-421, Dinacol EX-614B (all supplied by Nagase ChemteX corporation).

Examples of β-keto-ester based resins and analogous resins are resins having at least 3 repeating units comprising a functional group according to general formula III, IV or V general formula III

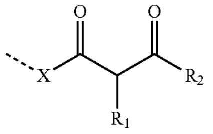

general formula IV

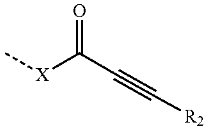

general formula V

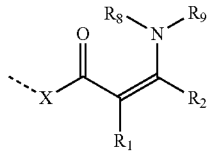

wherein $R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $C(=O)R_3$ and CN $R_2$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group and $C(=O)R_3$ $R_1$ and $R_2$ may represent the necessary atoms to form a five to eight membered ring $R_3$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $OR_4$ and $NR_5R_6$ $R_4$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_5$ and $R_6$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_5$ and $R_6$ may represent the necessary atoms to form a five to eight membered ring X is selected from the group consisting of O and $NR_7$ $R_7$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_8$ and $R_9$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_8$ and $R_9$ may represent the necessary atoms to form a five to eight membered ring.

In a preferred embodiment said oligomer or polymer comprising repeating units functionalized with a moiety according to general formula III, comprise at least 7 functionalized, more preferably at least 10 and most preferably at least 15 functionalized repeating units.

In a further preferred embodiment, X represents an oxygen. In an even further preferred embodiment, $R_1$ represents a hydrogen. In an even further preferred embodiment $R_2$ represent a substituted or unsubstituted alkyl group, unsubstituted being more preferred, a lower alkyl group being even more preferred and a methyl group being the most preferred.

The oligomer or polymer according to the present invention preferably has a weight average molecular weight of at least 2000, more preferably 4000 and most preferably between 6000 and 30000.

The polymer according to the present invention can be a homopolymer or a copolymer of different repeating units.

Oligomers or polymers according to the present invention can be prepared by addition polymerization of ethylenically unsatured monomers, polycondensation and ring opening polymerization, addition polymerization being particularly preferred. In the most preferred embodiment, free radical polymerization of ethylenically unsatured monomers is used to prepare the resins according to the present invention. In another embodiment of the present invention, the molecular weight of the resins according to the present invention is controlled using RAFT agents, ATRP, nitroxyl radical technology or transfer agents, preferably thiols.

Typical monomers for the preparation of resins according to the present invention are given in Table 1, 2 and 3 of the unpublished patent application EP19217051.2 which is hereby incorporated by reference.

Preferably, the β-keto-ester based resins and analogous resins having at least 3 repeating units comprising a functional group according to general formula III, IV or V, are encapsulated by polymerization, more preferably by using interfacial polymerization. Encapsulation of the resins makes the inkjet ink more reliable regarding jetting by means of inkjet heads.

The capsules are preferably present in the aqueous inkjet ink, in amount of no more than 45 wt. %, preferably between 5 and 25 wt. % based on the total weight of the ink. It was observed that above 30 wt. % jetting was not always so reliable.

The capsules to be used in the inkjet ink, have an average particle size of no more than 4 μm as determined by dynamic laser diffraction. The nozzle diameter of inkjet print heads is usually 20 to 35 μm. Reliable inkjet printing is possible if the average particle size of the capsules is five times smaller than the nozzle diameter. An average particle size of no more than 4 μm allows jetting by print heads having the smallest nozzle diameter of 20 μm. In a more preferred embodiment, the average particle size of the capsules is ten times smaller than the nozzle diameter. Hence preferably, the average particle size is from 0.05 to 2 μm, more preferably from 0.10 to 1 μm. When the average particle size of the capsule is smaller than 2 μm, excellent resolution and dispersion stability with time are obtained.

The capsules are dispersed in the aqueous medium of the inkjet ink using a dispersing group covalently bonded to the polymeric shell or are dispersed by using dispersants or surfactants preferably added during or after the formation of the capsule. The dispersing group covalently bonded to the polymeric shell is preferably selected from the group consisting of a carboxylic acid or salt thereof, a sulfonic acid or salt thereof, a phosphoric acid ester or salt thereof.

The dispersing group can be used in combination with a polymeric dispersant in order to accomplish steric stabilization. For example, the polymeric shell may have covalently bonded carboxylic acid groups that interact with amine groups of a polymeric dispersant. However, in a more preferred embodiment, no polymeric dispersant is used and dispersion stability of the inkjet ink is accomplished solely by electrostatic stabilization. For example, a slightly alkaline aqueous medium will turn the carboxylic acid groups covalently bonded polymeric shell into ionic groups, whereafter the negatively charged capsules have no tendency to agglomerate. If sufficient dispersing groups are covalently bonded to the polymeric shell, the capsule becomes a so-called self-dispersing capsule.

These negatively charged capsule surfaces can also be advantageously used during inkjet printing. For example, the aqueous liquid as a pre-treatment liquid containing a cationic substance, being a cationic polymer or multivalent salt, can be used to precipitate anionic stabilized colorants and anionic stabilized capsules of the aqueous inkjet ink printed on top of the pre-treatment liquid. By using this method an improvement in image quality can be observed due to the immobilisation of the capsules.

There is no real limitation on the type of polymer used for the polymeric shell of the capsule. Preferably, the polymer used in the polymeric shell is cross-linked. By crosslinking, more rigidity is built into the capsules allowing a broader range of temperatures and pressures for handling the capsules in both the ink making and in the inkjet printer.

Preferred examples of the polymeric shell material include polyureas, polyesters, polycarbonates, polyamides, melamine based polymers and mixtures thereof, with polyureas being especially preferred.

The oligomer or polymer having at least 3 repeating units comprising a functional group according to general formula III, IV or V with a polymeric shell, can be encapsulated using both chemical and physical methods. Suitable encapsulation methodologies include complex coacervation, liposome formation, spray drying and polymerization methods.

In the present invention preferably a polymerization method is used, as it allows the highest control in designing the capsules. More preferably interfacial polymerization is used to prepare the capsules of the invention. This technique is well-known and has been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

In interfacial polymerization, such as interfacial polycondensation, two reactants meet at the interface of the emulsion droplets and react rapidly.

In general, interfacial polymerisation requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerisation, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerisation. The capsules according to the present invention are preferably prepared from an oleophilic dispersion in an aqueous continuous phase.

Typical polymeric shells of the capsules according to the invention and formed by interfacial polymerisation are selected from the group consisting of polyamides, typically prepared from di- or poly-acid chlorides as first shell component and di- or oligo-amines as second shell component, polyurea, typically prepared from di- or oligo-isocyanates as first shell component and di- or oligo-amines as second shell component, polyurethanes, typically prepared from di- or oligo-isocyanates as first shell component and di- or oligo-alcohols as second shell component, polysulfonamides, typically prepared from di- or oligo-sulfochlorides as first shell component and di- or oligo-amines as second shell component, polyesters, typically prepared from di- or oligo-acid chlorides as first shell component and di- or oligo-alcohols as second shell component and polycarbonates, typically prepared from di- or oligo-chloroformates as first shell component and di- or oligo-alcohols as second shell component. The shell can be composed of combinations of these polymers.

In a further embodiment, polymers, such as gelatine, chitosan, albumin and polyethylene imine can be used as second shell components in combination with a di- or oligo-isocyanate, a di- or oligo acid chloride, a di- or oligo-chloroformate and an epoxy resin as first shell component.

In a particularly preferred embodiment, the shell is composed of a polyurea or a combination thereof with a polyurethane. In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent.

A water immiscible solvent is an organic solvent having low miscibility in water. Low miscibility is defined as any water solvent combination forming a two phase system at 20° C. when mixed in a one over one volume ratio.

The core contains the oligomer or polymer having at least 3 repeating units comprising a functional group according to general formula III, IV or V. These are usually incorporated into the capsules by dissolving it in the organic solvent having low miscibility with water and having a lower boiling point than water. A preferred organic solvent is ethyl acetate, because it also has a low flammability hazard compared to other organic solvents.

However, in some cases the organic solvent may be omitted. For example, the organic solvent can be omitted when the oligomer or polymer, having at least 3 repeating units comprising a functional group according to general formula III, IV or V have a viscosity of less than 100 mPa·s.

The method for preparing a dispersion of capsules preferably includes the following steps:

a) preparing a non-aqueous solution of a first shell component for forming the polymeric shell and the oligomer or polymer, having at least 3 repeating units comprising a functional group according to general formula III, IV or V in an organic solvent having a low miscibility with water and having a lower boiling point than water;
b) preparing an aqueous solution of a second shell component for forming the polymeric shell;
c) dispersing the non-aqueous solution under high shear in the aqueous solution;
d) optionally stripping the organic solvent from the mixture of the aqueous solution and the non-aqueous solution; and
e) preparing a polymeric shell around the oligomer or polymer, having at least 3 repeating units comprising a functional group according to general formula III, IV or V by interfacial polymerization of the first and second shell component for forming the polymeric shell.

The capsule dispersion can then be completed into the inkjet ink by addition of e.g. water, humectants, surfactant and the like.

In a preferred embodiment, the capsules are self-dispersing capsules. In order to make capsules self-dispersing, anionic dispersing groups, such as carboxylic acids or salts thereof, sulfonic acids or salts thereof, phosphoric acid esters or a salts thereof or a phosphonic acids or salts thereof, may be covalently bonded to the polymeric shell of the capsule to guarantee the dispersion stability.

A preferred strategy to incorporate anionic stabilizing groups into the polymeric shell of a capsule makes use of carboxylic acid functionalized reactive surfactants that are capable of reacting with isocyanates. This leads to an amphoteric type of surfactant containing at least partially secondary or primary amines. Other reactive surfactants functionalized with a sulfonic acid or salt thereof, a phosphoric acid ester or a salt thereof or a phosphonic acid or salt thereof can be used.

Several amphoteric surfactants, being mixtures of surfactants partially having secondary amines but also comprising tertiary amines are commercially available. Prohibitive foam formation in ink jet inks based on capsules made by using the commercially available amphoteric surfactants was encountered in an inkjet printer. Foaming caused problems in the ink supply and also in the degassing for trying to remove air from the ink, thus leading to unreliable jetting. Therefore, surfactants according to Formula (I) of WO2016/165970 are preferably used during the encapsulation process of the oligomer or polymer, having at least 3 repeating units comprising a functional group according to general formula III, IV or V.

In another embodiment of the present invention, said second resin capable of reacting with the primary amine functional group, is functionalized with Michael acceptors. In a preferred embodiment, said Michael acceptor is selected from the group consisting of an acrylate, a methacrylate, an acrylamide, a methacrylamide, a maleimide and a vinyl sulfone, an acrylate, a methacrylate and a maleimide being more preferred, an acrylate and a maleimide being the most preferred. Particularly preferred acrylate functionalized resins are prepared by polycondensation or ringopening polymersiation. Polyurethanes and polyesters are particularly preferred acrylated resins typically prepared by polycondensation, preferably using hydroxyl functionalized acrylates in the polycondensation reactions, respectively with difunctional isocyanates and acid chlorides.

Acrylated polyurethanes are most preferred and well known in the art of coatings, such as wood coatings ((Wade et al., JCT CoatingTech, 2(14), 42-46 (2005)), furniture coatings (Irle et al., RadTech Europe 05, conference proceedings, 1, 375-380 (2005) and pigmented coatings (Tielemans et al., Polymer Paint Colour Journal, 199, 4538, 31-33 (2009)). The technology has recently been reviewed by Tennebroek et al. (Polym. Int., 68, 832-842 (2019)).

Maleimide functionalized resins can be prepared by polycondensation as disclosed in WO2016113760 (Council of scientific and industrial research). Addition polymerisation for the preparation of maleimide functionalized resins has been disclosed by Grawe and Bufkin (Journal of Coating Technology, 53 (676), 45-55 (1981)). Strategies using protected maleimides and polymer post derivatisation in the preparation of maleimide functionalized resins have been disclosed by Hall et al. (Polym. Int. 60, 1149-1157 (2011)).

The Michael acceptor functionalized resins can be water soluble or water dispersible, water dispersible being more preferred, acrylate functionalized polyurethane latexes being the most preferred.

A.2.2. Solvent

The aqueous medium of the ink making part of the ink set according to the invention contains water, but may preferably include one or more water-soluble organic solvents. Suitable solvents which can be incorporated in the inks are preferably polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-prapanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'thiodiethanol, amides (e.g., N,N-dimethylformamide), heterocycles (e.g., 2-pyrrolidone and N-methyl-2-pyrrolidone), and acetonitrile.

A.2.3. Pigments

The aqueous ink making part of the ink set according to the invention comprises a colorant. The colorant may be a water-soluble dye, a disperse dye. Preferably the colorant is a pigment which can be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments are disclosed in paragraphs [0128] to [0138] of WO 2008/074548.

The pigment particles are dispersed in an aqueous medium by means of a polymeric dispersant or a surfactant. Self-dispersible pigments may also be used. If combined with capsules having anionic dispersing groups, anionic dispersants may be preferably used as dispersant for the pigment. The latter prevents interaction of the polymeric dispersant with the dispersing groups of capsules which may be included in the inkjet ink, since dispersion stability of the pigment is accomplished by the same technique of electrostatic stabilization as employed for the capsules.

A self-dispersible pigment is a pigment having on its surface covalently bonded anionic hydrophilic groups, such as salt-forming groups or the same groups used as dispersing groups for the capsules, that allow the pigment to be dispersed in an aqueous medium without using a surfactant or a resin. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. The average particle size of pigment particles is determined with a Brookhaven Instruments Particle Sizer BI90plus based upon the principle of dynamic light scattering. The ink is diluted with demi water to a pigment concentration of 0.002 wt %. The measurement settings of the BI90plus are: 5 runs at 23° C., angle of 90°, wavelength of 635 nm and graphics=correction function.

However, for white pigment inkjet inks, the numeric average particle diameter of the white pigment is the same as described in § A.1.4.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

Also special colorants may be used, such as fluorescent pigments for special effects in clothing, and metallic pigments for printing a luxury look of silver and gold colours on textiles.

Suitable polymeric dispersants for the pigments are copolymers of two monomers but they may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from Lubrisol. A detailed list of non-polymeric as well as some polymeric dispersants is disclosed by MC CUTCHEON. Functional Materials, North American Edition. Glen Rock, N.J.: Manufacturing Confectioner Publishing Co., 1990. p.110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

B. Method of Image Recording

In an embodiment of the inkjet image recording method using the ink set according to the invention, the method comprises the steps of: a) applying on a substrate, the aqueous liquid comprising an organic resin particle, the resin being a first resin comprising at least one repeating unit functionalized with a primary amine. The application is preferably done by a jetting technique such as inkjet, valve jet or spraying and; b) optionally at least partially dry the applied liquid and; c) jetting an aqueous inkjet ink to form an image, the ink comprising a colorant and a second resin capable of reacting with a primary amine functional group onto the applied liquid. More preferably, the second resin is selected from the group of epoxy based resins, β-keto-ester based resins and polymers functionalized with activated double bonds such as oligofunctional maleimides and acrylates and; d) drying the jetted inkjet by applying heat such that the temperature of the formed image is of at least 60° C., more preferably at least 80° C.

In another preferred inkjet recording method, the method comprises the steps of: a) forming an image by ink jetting the ink set comprising the aqueous liquid comprising an organic resin particle, the resin being a first resin comprising at least one repeating unit functionalized with a primary amine and the aqueous inkjet ink, the ink comprising a colorant and a second resin capable of reacting with a primary amine functional group onto a substrate, preferably a non-porous substrate. More preferably, the second resin is selected from the group of epoxy based resins, β-keto-ester based resins and polymers functionalized with activated double bonds such as oligofunctional maleimides and acrylates and; b) drying the jetted ink set by applying heat such that the temperature of the formed image is of at least 60° C., more preferably at least 80° C. The forming of the image, can be performed by jetting the aqueous liquid and the aqueous inkjet ink of the ink set sequentially or simultaneously.

In another embodiment of the inkjet recording method using the ink set according to the invention, the method comprises the steps of: a) jetting an aqueous inkjet ink on a substrate to form an image, the ink comprising a colorant and a second resin capable of reacting with a primary amine functional group. The substrate may have been treated with a fixer or primer liquid comprising a component capable of aggregating components in the aqueous inkjet ink of the ink set. Examples of such compounds are a flocculant or a cationic compound. The primer liquid may be the aqueous liquid comprising an organic resin particle, the resin being a first resin comprising at least one repeating unit functionalized with a primary amine. More preferably, the second resin is selected from the group of epoxy based resins, β-keto-ester based resins and polymers functionalized with activated double bonds such as oligofunctional maleimides and acrylates and; b) optionally at least partially dry the jetted ink and; c) applying the aqueous liquid comprising an organic resin particle, the resin being a first resin comprising at least one repeating unit functionalized with a primary amine on the jetted aqueous inkjet ink. The application is preferably done by a jetting technique such as inkjet, valve jet or spraying and; d) drying the jetted aqueous inkjet ink by applying heat such that the temperature of the formed image is of at least 60° C., more preferably at least 80° C.

The substrate in the inkjet recording method may be porous, such as e.g. textile, paper, leather and card board substrates, but is preferably a non-absorbing substrate such as polyethylene, polypropylene, polycarbonate, polyvinyl chloride, polyesters like polyethylene terephthalate (PET), polyethylene naphthalate (PEN), polylactide (PLA) or polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

The liquid comprising water and an organic resin particle, the resin being a first resin comprising at least one repeating unit functionalized with a primary amine is preferably applied via a technique selected from the group of ink jetting, valve jetting and spraying. More specifically, these techniques of ink jetting and valve jetting allow, the liquid according to the invention to be applied image wise, preferably onto the surfaces whereupon the inkjet ink will be printed to obtain an image. This process is also called under-printing. This has the advantages that the amount of required liquid is substantially lower than with other application methods of priming the substrate, that less liquid has to be dried and that the layer of dried primer may be less robust against interaction with chemicals and mechanical impact than the layer obtained by applying the inkjet ink.

Examples of the heating process to dry the applied ink set according to the invention include, but are not limited to, heat press, atmospheric steaming, high-pressure steaming, THERMOFIX. Any heat source can be used for the heating process; for example, an infrared ray source is employed.

The drying step can be performed at the air, but the heating step must be performed by using heat sources; examples include equipment for forced-air heating, radiation heating such as IR-radiation, including NIR- and CIR radiation, conduction heating, high-frequency drying, and microwave drying. The drying step is such that a temperature is preferably obtained below 150° C., more preferably below 100° C.

A preferred ink jet head for the inkjet printing system to jet the ink set according to the invention is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink or liquid. When the voltage is again removed, the ceramic expands to its original shape, ejecting a drop of ink from the ink jet head. However, the jetting of the ink set of the invention is not restricted to piezoelectric inkjet printing. Other inkjet print heads can be used and include various types, such as a continuous type, a thermal print head type, a MEM-jet type head and a valve jet type.

EXAMPLES

Materials

All compounds are supplied by TCI Europe unless otherwise specified.

- Desmodur N75 BA is a trifunctional isocyanate supplied by Bayer AG.
- Lakeland ACP70 is a zwitterionic surfactant supplied by Lakeland Laboratories LTD.
- Surfinol 104H is a surfactant supplied by Nissin Chemical Industry
- CATSURF-1, cationic surfactant synthesized as follows: 29 g (3-acrylamidopropyl)trimethylammonium chloride (supplied as 75 wt. % in water) was dissolved in 150 g isopropanol. 26.9 g octadecyl amine and 15 g triethyl amine were added and the mixture was heated to 80° C. for 24 hours. The solvent was removed under reduced pressure
- Alkanol XC is an anionic surfactant supplied by Dupont.
- Cab-o-Jet 465M is a magenta pigment dispersion supplied by Cabot
- Cab-O-Jet 450C is a cyan pigment dispersion supplied by Cabot
- MNDA is methyldiethanol amine, supplied by Aldrich
- Sub-1: poly(propylene) (Priplak), supplied by Antalis
- Sub-2: Synaps (SUV311) provide by Agfa-Gevaert NV
- Sub-3: polycarbonate (Lexan PC 9030 Clear), supplied by Lexan
- Sub-4: floated glass (Sn-contact side), supplied by Lerobel
- Sub-5: Stainless steel 316 L, supplied by Dejond (Wilrijk, Belgium)
- Sub-6: PVC (MD5-100), supplied by Metamark
- Sub-7: roughened and anodized lithographic aluminium printing plate substrate

Example 1

This example illustrates the increase in solvent resistance by using an ink set, comprising an aqueous inkjet ink comprising a R-keto-ester based resin, and an over-print varnish comprising an amine functionalized resin according to the present invention.

The Synthesis of Inventive Second Resin INVRES-1

10 g of 2-(acetoacetoxy)ethyl methacrylate was dissolved in 30 ml ethyl acetate. 0.472 g of dodecyl mercaptane was added and the mixture was purged with nitrogen. 134 mg of 2,2'-azobis[2-methylbutyronitrile] was added and the mixture was refluxed for 6 hours. The mixture was allowed to cool down to room temperature. The solution of inventive resin INVRES-1 in ethylacetate was directly used in the synthesis of the capsule INVCAP-1. The molecular weight of INVRES-1 was determined, using GPC relative to poly (styrene) standards. INVRES-1 had a numeric average molecular weight Mn of 10500 and a weight average molecular weight Mw of 15400.

The Preparation of the Capsule Comprising a β-Keto-Ester Based Resin INVCAP-1

13.2 g of Desmodur N75 BA was added to 37 g of the above described solution of INVRES-1 in ethyl acetate. 1.2 g of Lakeland ACP 70 was added and the solution was stirred for an hour at room temperature. This solution was added to a solution of 3.36 g Lakeland ACP 70, 1.17 g lysine and 1.5 g triethanol amine in 44 g water, while stirring with an Ultra Turrax at a rotation speed 16000 rpm for 5 minutes. 52 g water was added and the solvent evaporated at 60° C. under reduced pressure, while gradually increasing the vacuum from 500 mbar to 120 mbar. The weight of the dispersion was adjusted to 88 g by evaporating water at 120 mbar. The dispersion was stirred for 16 hours at 65° C. The dispersion was allowed to cool down to room temperature and the dispersion was filtered over a 1.6 μm filter. Average particle sizes of all capsule dispersions were measured using a Zetasizer™ Nano-S (Malvern Instruments, Goffin Meyvis). The average particle size of INVCAP-1 was 183 nm.

Inventive Aqueous Ink INV-1

Inventive ink INV-1 was prepared by mixing the components according to Table 1. All weight percentages are based on the total weight of the ink jet ink.

TABLE 1

| Weight % of | INV-1 |
|---|---|
| INVCAP-1 | 38 |
| Cab-O-Jet 465M | 22 |
| Surfinol 104H | 2 |
| Dowanol DPM | 19 |
| Ethylene glycol | 19 |

The Aqueous Liquid Having a Primary Amine Functionalized Colloid AMINE-1

The primary amine functionalized polymer dispersion AMINE-1 was prepared as described below.

A solution of 7 g octadecyl isocyanate in 40 g acetone was added over 3 minutes at room temperature to a mixture of 50 g of a 20w % poly(allylamine) (Mw: 60000) in water and 200 g acetone. The mixture was stirred for 3 minutes using an Ultra Turrax at 15000 RPM. The mixture was refluxed for 20 minutes. The mixture was allowed to cool down to room temperature and stirred for 3 minutes using an Ultra Turrax at 15000 RPM.

A solution of 2 g ethyl oxalate in 20 g acetone was mixed with a solution of CATSURF-1 in 4 g methanol. This mixture was stirred for 10 minutes at room temperature and added over 3 minutes to the polymer solution described above, followed by stirring with an Ultra Turrax at 15000 RPM. The mixture was stirred for 30 minutes at room temperature. 50 g water was added. The solvent and water was evaporated under reduced pressure to adjust the weight of the dispersion to 80 g. 0.3 of Proxel K was added as biocide.

The average particle size was measured using a Zetasizer™ Nano-S (Malvern Instruments, Goffin Meyvis). The average particle size was 71 nm.

Comparative Ink INKCOMP-1

State of the art poly(urethane) based inks have been disclosed in WO2018077624. Based on WO2018077624, comparative ink COMP-1 has been formulated by mixing the components according to Table 2. All weight percentages are based on the total weight of the ink jet ink.

TABLE 2

| Weight % of | INKCOMP-1 |
|---|---|
| PU-1 | 28.5 |
| Cab-O-Jet 450C | 20 |
| Tego Wet 270 | 0.6 |
| 2-pyrrolidone | 20 |
| 1,2-hexane diol | 20 |
| water | 10.9 |

PU-1 has been prepared as PU-9, disclosed in WO2018077624.

Adhesion and Chemical Resistance Test of Image Formed by Means on Inventive Ink Set The inventive ink INV1 and the comparative ink INK-COMP-1 were coated on a series of substrates, using a 4 micron wired bar, and dried for 15 minutes at 80° C.

The inventive examples were over coated with the primary amine functionalized colloid AMINE-1, using a 4 micron wired bar, and dried for 15 minutes at 80° C. Hence, AMINE-1 functions as an over-print varnish. The adhesion of each sample was evaluated by a cross-cut test according to ISO2409:1992(E). Paints (International standard 1992-08-15) using a Braive No. 1536 Cross Cut Tester from BRAIVE INSTRUMENTS with spacing of a 1 mm between cuts and using a weight of 600 g, in combination with a Tesatape™ 4104 PVC tape. The evaluation was made in accordance with the criteria described in Table 3, where both the adhesion in the cross-cut and outside the cross-cut were evaluated.

TABLE 3

| Evaluation value | Criterion |
|---|---|
| 0 | Nothing removed, perfect adhesion. |
| 1 | Detachment of only very small parts of the cured layer, almost perfect adhesion |
| 2 | Minor parts of the cured layer was removed by the tape, good adhesion |
| 3 | Parts of the cured layer were removed by the tape, poor adhesion |
| 4 | Most of the cured layer was removed by the tape, poor adhesion |
| 5 | The cured layer was completely removed from the substrate by the tape, no adhesion |

The water resistance and solvent resistance was evaluated by wiping 40 times with a Q-tip over the coatings using water, isopropanol and methyl ethyl ketone respectively. The results are summarized in Table 4.

A score of 0 means very severe damage when wiping with a Q-tip, while a score of 2 means hardly or no damage upon wiping. A score of 1 means visible damage upon wiping.

TABLE 4

| | Inventive ink set | | | | Comparative ink | | | |
|---|---|---|---|---|---|---|---|---|
| | Adhesion | MEK | IPA | Water | Adhesion | MEK | IPA | water |
| Sub-1 | 0 | 2 | 2 | 2 | 5 | 0 | 0 | 0 |
| Sub-2 | 0 | 2 | 2 | 2 | 0 | 0 | 1 | 2 |
| Sub-3 | 0 | 2 | 2 | 2 | 0 | 0 | 1 | 2 |

TABLE 4-continued

| | Inventive ink set | | | | Comparative ink | | | |
|---|---|---|---|---|---|---|---|---|
| | Adhesion | MEK | IPA | Water | Adhesion | MEK | IPA | water |
| Sub-4 | 0 | 2 | 2 | 0 | 5 | 0 | 1 | 0 |
| Sub-5 | 0 | 1 | 1 | 1 | 0 | 0 | 1 | 2 |
| Sub-6 | 2 | 1 | 1 | 1 | 0 | 0 | 0 | 2 |
| Sub-7 | 0 | 1 | 1 | 0 | 5 | 0 | 1 | 0 |

From Table 4, it becomes apparent that the crosslinking approach by using the ink set according to the present invention gives considerably more latitude in chemical resistance on different substrates, while maintaining excellent adhesion performance, in comparison with a poly(urethane) based resin ink.

Example 2

This example illustrates the potential of sol-gel based primary amine functionalized colloids as jettable reactive resins in combination with aqueous inkjet inks comprising a β-keto-ester based resin.

Primary Amine Functionalized Resin Particle AMINE-2

A mixture of 5 g of dimethyloctadecyl[3-(trimethoxysilyl)propyl]ammonium chloride and 30 g of 3-aminopropyltrimethoxysilane was added to 100 g of water while stirring with an Ultra Turrax for 5 minutes at 18000 rpm. 50 ml water was added and the mixture was evaporated at 65° C. over two hours under reduced pressure to remove the methanol that is formed during the reaction. The mixture was further evaporated to obtain a 25 w % dispersion.

The average particle size was measured using a Zetasizer™ Nano-S (Malvern Instruments, Goffin Meyvis). A dual particle size distribution was obtained, with a main peak around 17 nm and a second maximum around 140 nm.

Aqueous Liquid Containing Primary Amine Functionalized Resin Particle: INKAMIN-2

INKAMIN-2 was prepared by mixing the components according to Table 5. All weight percentages are based on the total weight of the ink jet ink.

TABLE 5

| Weight % of | INKAMIN-2 |
|---|---|
| AMINE-2 | 60 |
| glycol | 20 |
| Dowanol DPM | 20 |

Jetting of Ink Set According to the Invention on Polypropylene Substrate

Inventive ink INV-1 was printed on a polyester cotton mixed fiber fabric using a Dimatix™ DMP2831 system, equipped with a standard Dimatix™ 10 pl print head. The ink was jetted at 22° C., using a firing frequency of 5 kHz, a firing voltage of 25 V and a standard waveform. The ink layer was overprinted twice with INKAMIN-2, using a Dimatix™ DMP2831 system, equipped with a standard Dimatix™ 10 pl print head. The ink was jetted at 22° C., using a firing frequency of 5 kHz, a firing voltage of 25 V and a standard waveform. A reference sample was printed only with inventive ink INV-1. The samples were dried at 80° C. for 15 minutes.

After printing and drying of the solid areas on the fabric, the dry and wet crock fastness test is done according to ISO105-X12 with a Crockmeter SDL ATLAS M238AA.

The coloration of the white rubbing cloth was given as ΔE according to the Cielab color space. The lower the ΔE values, the better the crock fastness.

The results are summarized in Table 6.

TABLE 6

| | Inventive sample | Reference sample |
|---|---|---|
| Dry crock | 7.8 | 8.4 |
| Wet crock | 12.4 | 35.6 |

From table 6, it becomes apparent that an ink set according to the invention and comprising an aqueous ink comprising a capsule containing a β-keto ester and an aqueous liquid comprising primary amine functionalized resin particles leads to images giving clearly improved wet crock values with respect to a reference aqueous ink.

The invention claimed is:

1. An ink set for inkjet printing comprising an aqueous liquid containing an organic resin particle comprising a first resin having at least one repeating unit functionalized with a primary amine and an aqueous inkjet ink containing a colorant and a second resin capable of reacting with the primary amine functional group of the first resin wherein the first resin is a cationic polymer having at least: (1) a repeating unit selected from the group consisting of a vinyl amine and an allyl amine, (li) an oxalyl amide crosslinking unit —NHCOCONH—, wherein the dashed lines represent the covalent bond to the polymer residue of the first resin, and (iii) a repeating unit according to Formula I or Formula II:

Formula I

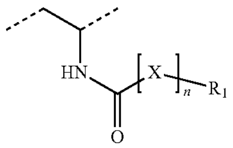

wherein

X represents O or NH;

n represents 0 or 1; and $R_1$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, with the proviso that $R_1$ contains at least six carbon atoms, of Formula II

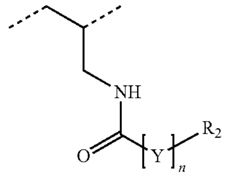

wherein

Y represents O or NH;

a represents 0 or 1; and $R_2$ is selected from the group consisting of a substituted or unsubstituted alkyl group, a substituted or unsubstituted alkenyl group, a substituted or unsubstituted alkynyl group, a substituted or unsubstituted aralkyl group, a substituted of unsubstituted alkaryl group, and a substituted or unsubstituted aryl or heteroaryl group, with the proviso that $R_2$ contains at least six carbon atoms.

2. The ink set of claim 1, wherein the first resin contains at least 15 mol % of repeating units functionalized with a primary amine with respect to the total amount of resin.

3. The ink set of claim 1, wherein the amine content of the first resin, expressed as mg $NH_2$ per g resin, is at least 90 mg/g.

4. The ink set of claim 1, wherein the liquid comprises a component capable of aggregating components in the aqueous inkjet ink.

5. The ink set of claim 4, wherein the component is a multivalent metal salt or a cationic polymer.

6. The ink set of claim 1, wherein the second resin is selected from the group consisting of epoxy based resins, β-keto-ester based resins and polymers functionalized with activated double bonds such as oligofunctional maleimides and acrylates.

7. The ink set of claim 6, wherein the B-keto-ester based resin is encapsulated by means of a polymeric shell.

8. The ink set of claim 7, wherein the polymeric shell comprises a dispersing group covalently bonded to the polymeric shell and is selected from the group consisting of a carboxylic acid or salt thereof, a sulfonic acid or salt thereof, and a phosphoric acid ester or salt thereof.

9. A method of image recording, the method comprising:

i) applying the ink set as defined in the claim 1 onto a substrate to form an image; and ii) drying the applied ink set by means of heat to obtain a temperature of the image of at least 60° C.

10. The method of claim 9, wherein the ink set is applied by means of a jetting technique such as inkjet, valve jet, or spraying.

* * * * *